United States Patent [19]
Baltus et al.

[11] Patent Number: 5,762,226
[45] Date of Patent: Jun. 9, 1998

[54] STEAM-TABLE-PAN CARRYING COVER WITH PAN-RETAINING STOP

[75] Inventors: Jerome K. Baltus, Plymouth; Gene H. Jentink, Cedar Grove; Brian J. Siehr, Manitowoc; Lee W. Wolf, Sheboygan, all of Wis.

[73] Assignee: Polar Ware Company, Sheboygan, Wis.

[21] Appl. No.: 819,331

[22] Filed: Mar. 18, 1997

Related U.S. Application Data

[63] Continuation-in-part of Ser. No. 635,036, Apr. 19, 1996, Pat. No. 5,632,398.

[51] Int. Cl.⁶ .................................................. B65D 25/28
[52] U.S. Cl. .......................... 220/212.5; 220/351; 220/346
[58] Field of Search .................................. 220/212.5, 252, 220/346, 351; 215/322

[56] References Cited

U.S. PATENT DOCUMENTS

| | | |
|---|---|---|
| 646,283 | 3/1900 | Heatly et al. . |
| 804,110 | 11/1905 | Favorite et al. . |
| 828,151 | 8/1906 | Upjohn . |
| 1,074,978 | 10/1913 | Relyea . |
| 1,660,540 | 2/1928 | Wulftange . |
| 1,962,860 | 6/1934 | Duell et al. . |
| 2,064,241 | 12/1936 | Batdorf . |
| 2,083,356 | 6/1937 | Batdorf . |
| 2,102,094 | 12/1937 | Romig . |
| 2,295,747 | 9/1942 | Mills . |
| 2,463,586 | 3/1949 | Anderson . |
| 3,237,552 | 3/1966 | Cronheim . |
| 3,854,649 | 12/1974 | Wagner et al. . |
| 3,927,820 | 12/1975 | Wagner et al. . |
| 4,225,052 | 9/1980 | Tector et al. . |
| 4,342,403 | 8/1982 | Badtke et al. . |
| 4,360,148 | 11/1982 | Forbes et al. . |
| 4,469,241 | 9/1984 | Westphal . |
| 4,917,254 | 4/1990 | Ciriacks ................... 220/351 X |
| 4,967,995 | 11/1990 | Burgess . |
| 5,021,218 | 6/1991 | Davis et al. .............. 220/351 X |
| 5,119,800 | 6/1992 | Roberts et al. . |
| 5,129,538 | 7/1992 | Bennett . |
| 5,361,933 | 11/1994 | Oster . |
| 5,367,718 | 11/1994 | Ellis . |
| 5,375,698 | 12/1994 | Ewart et al. .................. 206/5.1 |
| 5,400,914 | 3/1995 | Lin . |
| 5,458,256 | 10/1995 | Opheim . |

FOREIGN PATENT DOCUMENTS

495204  10/1919  France .

Primary Examiner—Stephen Cronin
Attorney, Agent, or Firm—Jansson, Shupe, Bridge & Munger, Ltd.

[57] ABSTRACT

Disclosed is the combination of a steam table pan for keeping food warm and a cover for lifting and carrying the pan. The pan is of the type including a container portion, a pair of side edges and a pair of end edges. All of the edges protrude away from the container portion and one of the end edges includes a downwardly-turned lip. The cover has a pair of side channels, each for engaging a respective side edge of the pan, and each side channel includes an upper member, an edge panel extending downwardly from the upper member, and a lip extending inwardly from the edge panel. The upper member and the lip of each of the side channels are spaced apart by a first dimension. In the improvement, the cover includes an end channel having an upper component, an end panel extending downwardly from the upper component, a ledge extending inwardly from the end panel and a stop extending upwardly from the ledge. The stop has a border spaced from the upper component by a second dimension which is less than the first dimension.

9 Claims, 8 Drawing Sheets

STEAM-TABLE-PAN CARRYING COVER WITH PAN-RETAINING STOP

RELATED APPLICATION

This application is a continuation-in-part of application Ser. No. 08/635,036 filed on Apr. 19, 1996, now U.S. Pat. No. 5,632,398.

FIELD OF THE INVENTION

This invention relates to receptacles and, more particularly, to receptacles for carrying food and for holding such food as it is being served.

BACKGROUND OF THE INVENTION

A common sight in virtually any cafeteria or restaurant buffet setting is a steam table. Such a table has a upper surface with a number of relatively-large rectangular openings therethrough. Each opening receives a pan, the horizontal, outwardly-protruding edges of which are against the surface and prevent the pan from falling through the opening. Beneath the upper surface (and beneath the pans placed therein) is a shallow reservoir of hot water. Heat rising upwardly therefrom keeps the contents of the pans hot for serving.

Single-pan arrangements are sometimes known as "chafers" and use a source of heat, e.g., gelled combustible fuel or hot water, below the leg-supported serving pan. An example of a chafer of the type which uses hot water to keep food warm is shown in U.S. Pat. No. 5,119,800 (Roberts et al.).

For any of several reasons, steam table pans are notoriously difficult to handle. One reason is that they are large, unwieldly and when filled with food, comparatively heavy. Of course, relative weight is subjective but to a diminutive food server working on a cafeteria line, a steam table pan filled with, e.g., mashed potatoes or barbecued beef is likely to be considered heavy.

Another reason that steam table pans are difficult to handle arises from the fact that certain types of such pans have four flat edges protruding outwardly from the container portion. Each edge is substantially planar (as opposed to "rolled" or bead-like as the pan shown in U.S. Pat. No. 3,237,552 to Cronheim) and when the pan is mounted in an opening in the steam table, the pan edges are essentially flat against the steam table upper support surface. It is difficult to get one's fingers between the pan edge and the support surface to lift the pan out of its opening.

And it is difficult to "gracefully" release a filled pan into its opening—one must simply let go and tolerate the pan free—falling a short distance into position. For pans containing significant liquid, a spill may result.

Yet another disadvantage of known steam table pans and their covers is that the cover simply rests atop the pan with little if any "structure" to retain the cover in position. The person carrying the pan (and its hot contents) usually uses insulated pads and must, however awkwardly, somehow hold the cover in place while carrying.

A cover for carrying a steam table pan which overcomes some of the problems and shortcomings of known arrangements would be an important advance in the art.

OBJECTS OF THE INVENTION

It is an object of the invention to provide a cover for carrying a steam table pan which overcomes some of the problems and shortcomings of the prior art.

Another object of the invention is to provide a cover for securely engaging a steam table pan while such pan is being carried.

Another object of the invention is to provide a cover for securely engaging and carrying a steam table pan even though the pan and cover may be tipped significantly.

Another object of the invention is to provide such a cover which eliminates or at least minimizes the need to use insulated pads while carrying a steam table pan.

Yet another object of the invention is to provide such a cover which makes it easy to place a filled pan into a steam table.

Another object of the invention is to provide such a cover which helps avoid spills when placing a steam table pan containing liquid.

Another object of the invention is to provide such a cover which makes it easy to lift a pan out of a steam table. How these and other objects are accomplished will become apparent from the following descriptions and from the drawings.

SUMMARY OF THE INVENTION

The invention involves the combination of a steam table pan for keeping food warm and a cover for lifting and carrying the pan. Such invention addresses the related problems of carrying the pan and preventing such pan from separating from the cover during such carrying.

The pan includes a container portion, a pair of side edges and first and second end edges. All of the edges protrude outwardly away from the container portion and the second end edge of the pan includes a downwardlyturned lip.

The carrying cover includes a pair of side channels, each for engaging a respective side edge of the pan. Each cover side channel includes an upper member, an edge panel extending downwardly from the upper member, and a lip extending inwardly from the edge panel. The upper member and the lip of each of the side channels are spaced apart by a first dimension.

In the improvement, the cover includes an end with a channel having an upper component, an end panel extending downwardly from the upper component, a ledge extending inwardly from the end panel and a stop extending upwardly from the ledge. The stop has a border spaced from the upper component by a second dimension which is less than the first dimension.

In a more specific aspect of the invention, the cover has a first end and a second end. The first end is open and the cover end channel extends along the second end. The open first end permits the cover to slidably engage the pan.

In a specific embodiment, the stop border is substantially parallel to the upper component of the cover channel. And when the cover is on the pan, the border is parallel to the second end edge of the pan.

The combination is characterized by certain features, depending upon the then—existing relationship of the pan, the cover and a support surface, e.g., a table. The lip of the second end edge of the pan has a rim and in the "at rest" position, i.e., when the cover is on the pan, the pan is at rest on a surface and the cover is at rest on the pan, the border is below the rim. In the "pan carry" mode, i.e., when the cover is on the pan, the pan is spaced from a surface and the cover supports the pan, the border is above the rim.

In another aspect of the invention, the stop and the lip are in overlapping engagement with one another. When the pan and cover are in the pan carry mode as described above, the stop and the lip contact one another. Stop and lip overlapping engagement and contact will occur if the pan and cover are tipped so that the first end edge of the pan and the open first end of the cover are lower than the second end edge of the pan and the cover second end.

Other details of the invention are set forth in the following detailed description and in the drawings.

BRIEF DESCRIPTION OF THE DRAWINGS

FIG. 13 is an enlarged view of an end of the cover and an edge of the pan shown in FIG. 12. FIG. 13 represents the "pan—carry" mode described below. Parts are broken away.

FIG. 14 is an enlarged view of an end of the cover and an edge of the pan shown in FIG. 12. FIG. 14 represents the "at—rest" mode described below. Parts are broken away.

FIG. 17 is an enlarged view of an end of the cover and an edge of the pan shown in FIG. 12. FIG. 17 represents the "pan—carry" mode when the pan and cover are tilted to cause the pan to slide and contact and be held by the cover. Parts are broken away.

DETAIL DESCRIPTION OF PREFERRED EMBODIMENTS

Referring to FIGS. 1-6, the new carrying cover 10 is configured for a food pan 11 of the type used in steam tables for keeping food warm. The cover 10 includes a pair of side channels 13 and 15 oriented generally parallel to one another and first and second cover ends 17 and 19, respectively. Such ends 17, 19 are generally parallel to one another and generally normal to the side channels 13, 15. A loop handle 21 is used to lift the cover 10 and the pan 11 engaged therewith.

As shown in FIGS. 1, 2, 7, 8, and 9, the center point 25 of the handle 21 is positioned closer to the first end 17 (that cover end 17 which has no channel and, thus, is open) than to the cover second end 19 which has an end channel 23. In more specific terms, the dimension D1 is slightly greater than the dimension D2. In a very specific embodiment, such dimensions D1 and D2 are about 10.8 inches and 10.2 inches, respectively. The handle 21 has a long axis 27 and best "control" of the cover 10 and a pan 11 being carried thereby results when such axis 27 is generally parallel to the side channels 13, 15.

Figure 1:
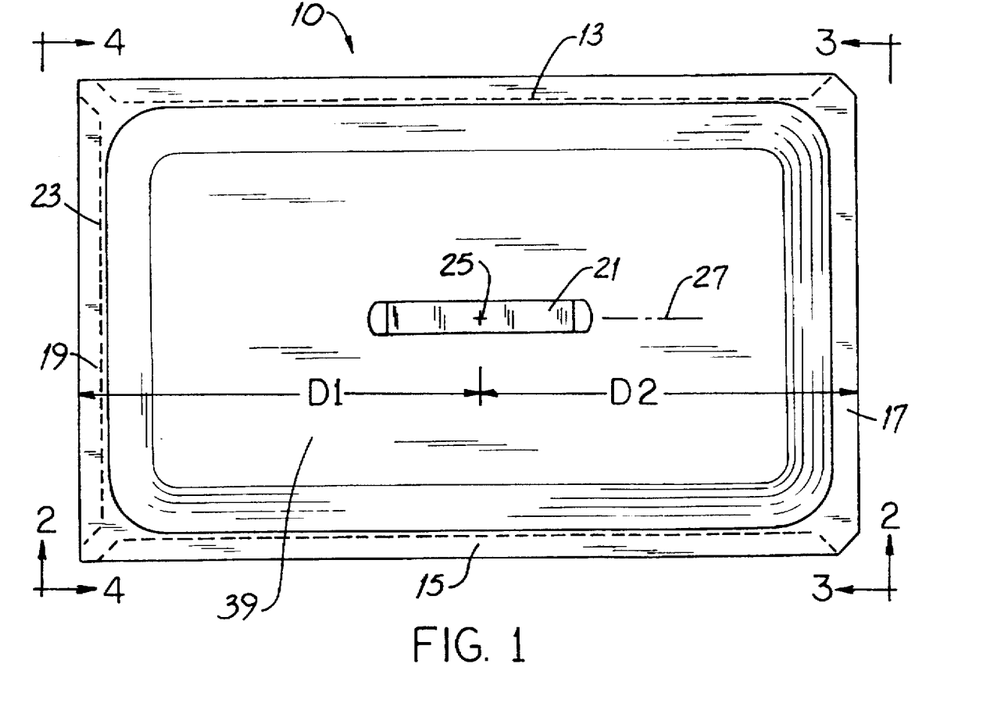
FIG. 1 is a top plan view of the new cover for carrying a steam table pan. Surfaces of parts are shown in phantom (dashed) outline.
Figure 2:
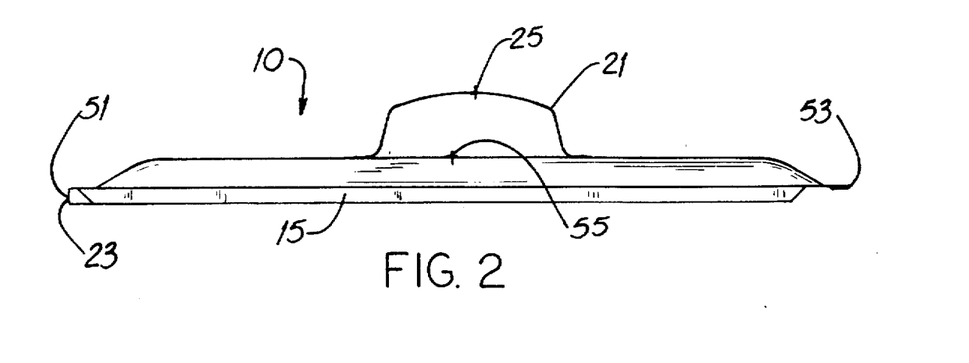
FIG. 2 is a side elevation view of the cover of FIG. 1 taken along the viewing plane 2—2 thereof.
Figure 3:
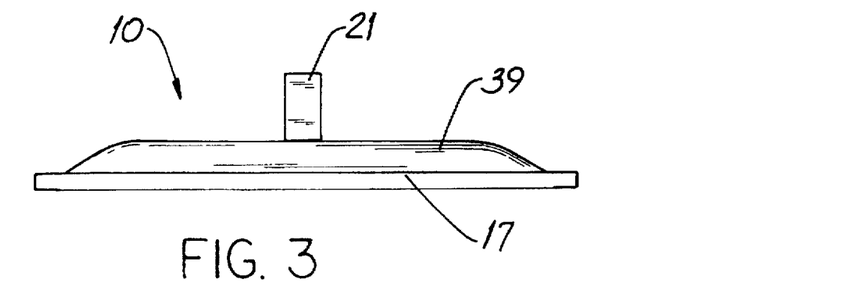
FIG. 3 is an elevation view of the first end of the cover of FIG. 1 taken along the viewing plane 3—3 thereof.
Figure 4:
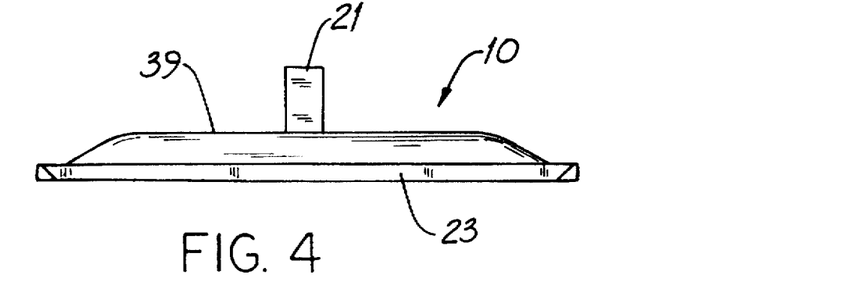
FIG. 4 is an elevation view of the second end of the cover of FIG. 1 taken along the viewing plane 4—4 thereof.
Figure 5:
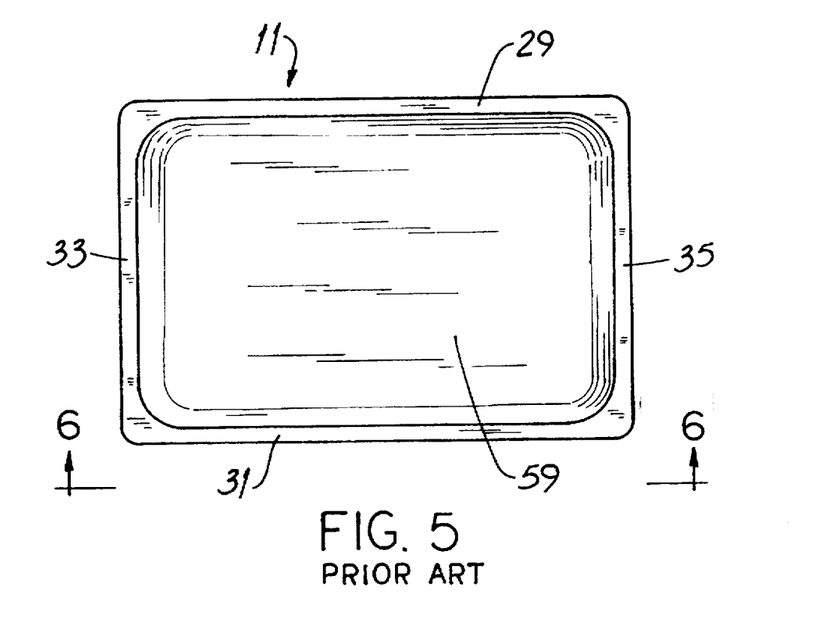
FIG. 5 is a top plan view of a prior art steam table pan.
Figure 6:
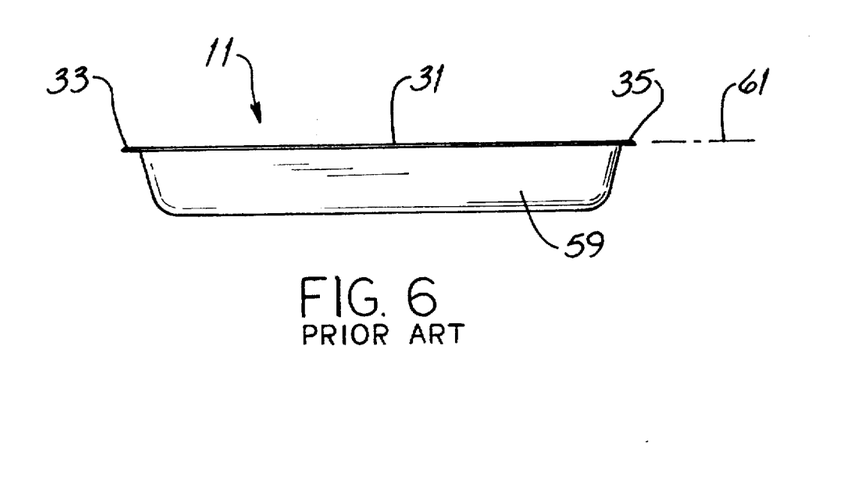
FIG. 6 is an elevation view of the pan of FIG. 5 taken along the viewing plane 6—6 thereof.
Figure 7:
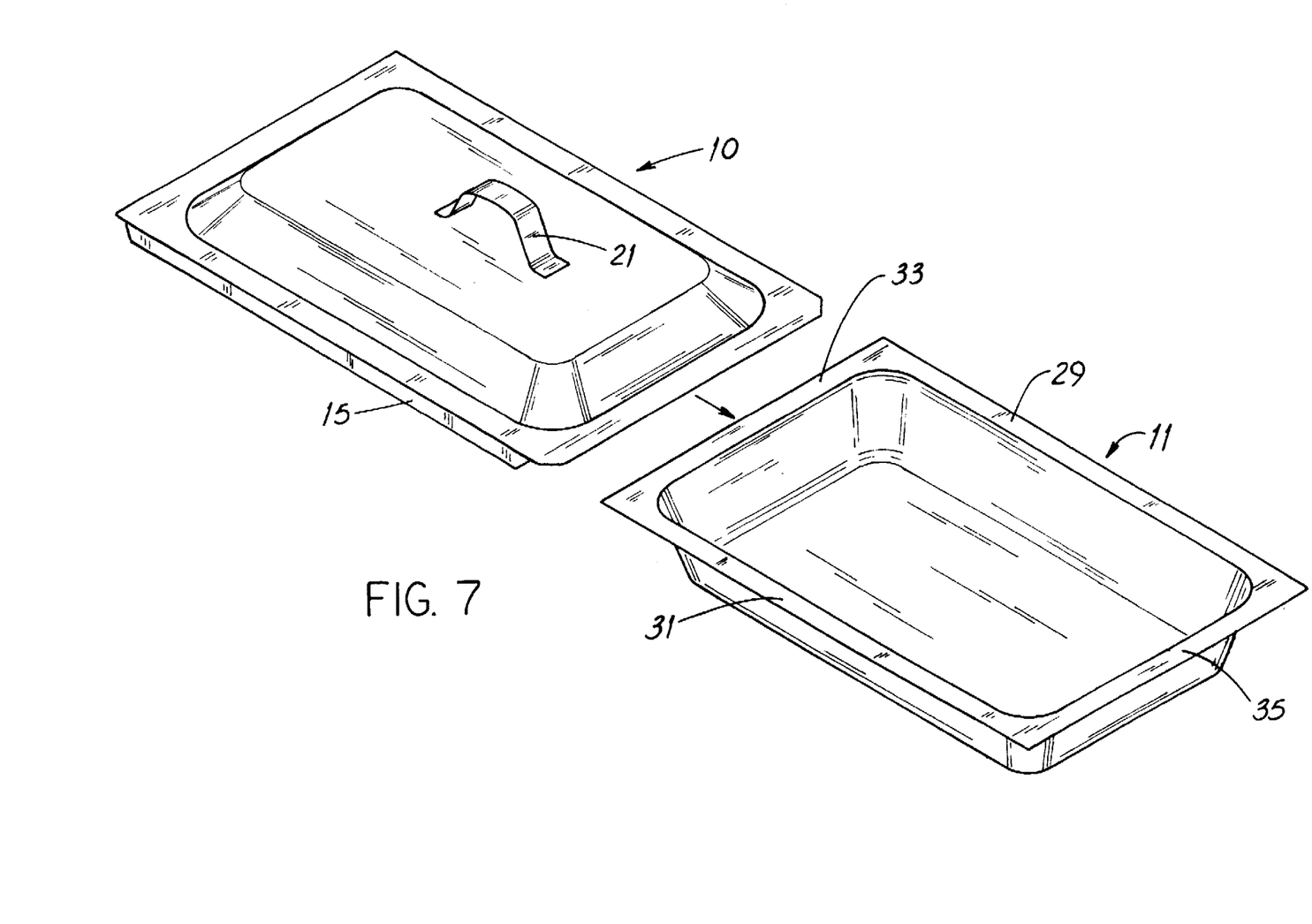
FIG. 7 is a perspective view of the cover of FIGS. 1-4 and the pan of FIGS. 5 and 6 showing how the cover slides into engagement with the pan.
Figure 10:
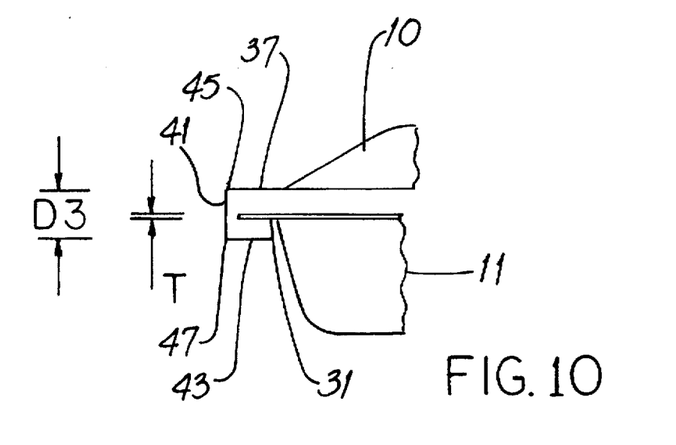
FIG. 10 is an elevation view of a cover channel and an edge of a steam table pan. Parts are broken away.
Figure 11:
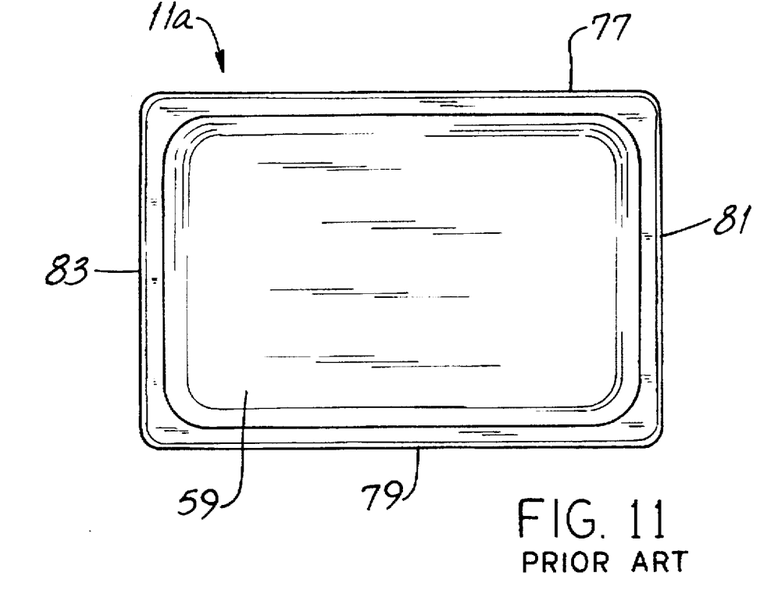
FIG. 11 is a top plan view of another embodiment of a prior art steam table pan.

The cover side channels 13 and 15 are configured for engaging respective side edges 29, 31 of the pan 11 while the cover end channel 23 is configured to engage a pan end edge 33. Referring particularly to FIGS. 1, 2 and 10, each channel 13, 15 and 23 includes an upper member 37 extending away from the dome—like cover central portion 39 and an edge panel 41 extending downwardly from the upper member 37. A retention lip 43 extends inwardly from each edge panel 41. As to each channel 13, 15, or 23, the upper member 37, the edge panel 41 and the lip 43 form a horizontally-facing channel in which the juncture 47 of the upper member 37 and the edge panel 41 and the juncture 47 of the edge panel 41 and the lip 43 are substantially right angles.

Referring particularly to FIGS. 1 and 2, in other aspects of the invention, the cover 10 has a pair of end boundaries 51, 53 and a center point 55 halfway between them. The carrying handle 21 has a middle region and center point 25 and it is particularly noteworthy that the handle center point 25 is spaced slightly from the cover center point 55. P In other words, the handle middle region is slightly "off center". When the middle region is so positioned, the weight of the pan 11 tends to urge the pan 11 toward the end channel 23 rather than toward the open cover end 17 opposite the cover end channel 23.

Referring to the FIGURES and particularly to FIGS. 5, 6, 8, 9 and 10, another aspect of the invention involves the combination of a steam table pan 11 and the carrying cover 10. The pan 11 includes a container portion 59 and four edges 29, 31, 33, 35 protruding outwardly from the container portion 59. Each edge 29, 31, 33, 35 is substantially flat (as opposed to "rolled" or bead—like) and all edges 29, 31, 33, 35 are coincident with a common plane 61. When the pan 11 is resting on a table or in a steam table, the plane 61 is horizontal.

Figure 8:
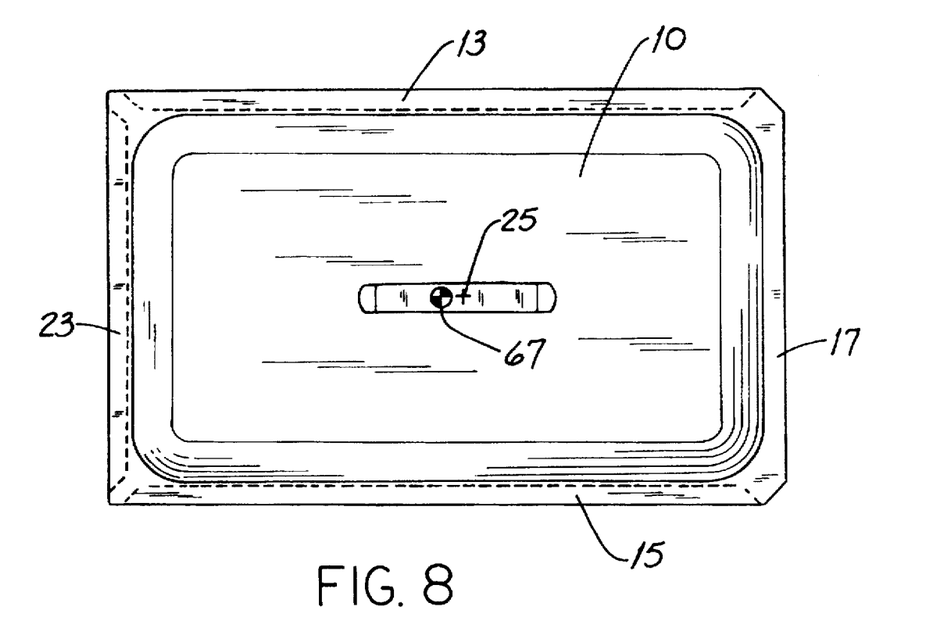
FIG. 8 is a top plan view of the cover generally like that of FIG. 1. Surfaces of parts are shown in phantom (dashed) outline.
Figure 9:
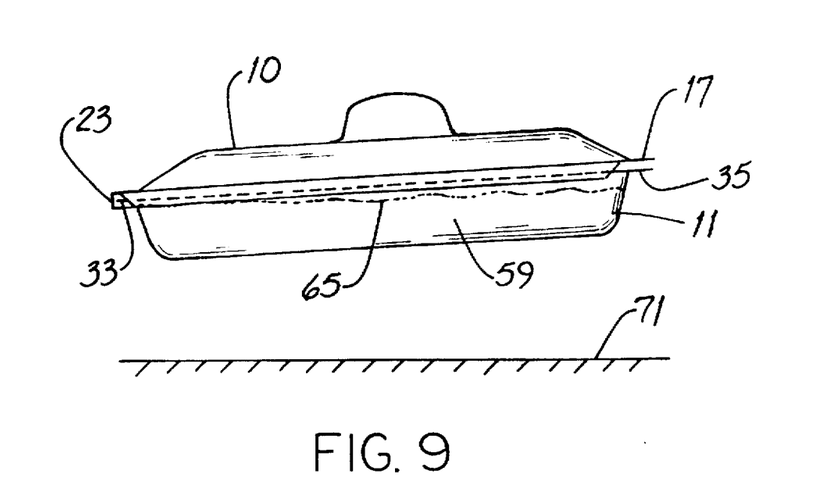
FIG. 9 is a side elevation view of the new cover and a steam table pan filled with food, both slightly above and angled with respect to a horizontal surface. Certain surfaces are shown in phantom (dashed) outline.

When the cover 10 is mounted on the pan 11 and used to lift or carry the pan 11 as shown in FIGS. 8 and 9, a separate pan edge 29, 31, 33 is between the upper member 37 and the lip 43 of each channel 13, 15, 23 and the dimension D3 between the upper member 37 and the lip 43 is substantially greater than the thickness T of the pan edge, e.g., edge 31 therebetween. To put it in other words, there is some clearance between the channel 13, 15, 23 and its respective pan edge 29, 31, 33 so that the cover 10 may slide easily into and out of engagement with the pan 11. (For clarity of explanation, the exemplary pan edge 31 is shown spaced from both upper member 37 and lip 43. When the cover 10 is mounted on the pan 11 in a pan—carrying position, the edge 31 rests on the lip 43.)

The pan edges include two illustrated side edges 29, 31 and two end edges 33, 35, each of the latter being somewhat shorter than each of the former. The cover side channels 13, 15, each engage a respective side edge 29, 31 and the cover 10 includes but a single end channel 23 engaging one of the end edges 33 or 35. That is, the other end edge 35 or 33 is free of engagement with any end channel 23 on the cover 10. (In the FIGURES and the specification, the cover end channel 23 is shown to engage the edge 33 of the pan 11 and the cover first end 17 which is open is adjacent to the edge 35 of the pan 11. But of course, the end channel 23 may engage the edge 35 of the pan 11 which is symmetrical.)

Referring next to FIGS. 8 and 9, the pan 11 is substantially filled with food 65 and the pan-food combination has a center of gravity as represented by the symbol 67. The carrying handle center point 25 is between the center of gravity 67 and the first end 17, i.e., the open end. When the cover 10 is mounted to the pan 11, there is a pan edge 33 in the sole cover end channel 23. And when the cover 10 supports the pan 11 above a surface 71 (e.g., a floor) as when the pan 11 is being carried by the cover 10, the cover 10 and pan 11 are angled with respect to such surface 71 as shown in FIG. 9. Gravity urges the pan edge 33 toward the end channel 23, thereby securely holding the pan 11 in the cover 10.

Referring now to FIGS. 11 through 17, a slightly different embodiment of the steam table pan 11a includes a container portion 59 in which food is placed for serving. The pan 11a has a pair of side edges 71 and 79 and first and second end edges 81 and 83, respectively. All of the edges 77, 79, 81, 83 protrude outwardly away from the container portion 59 and are downwardly curved, i.e., curved away from the viewer of FIG. 11. The second end edge 83 of the pan includes a downwardly-turned lip 85 having a horizontally—protruding lateral member 87.

Figure 12:
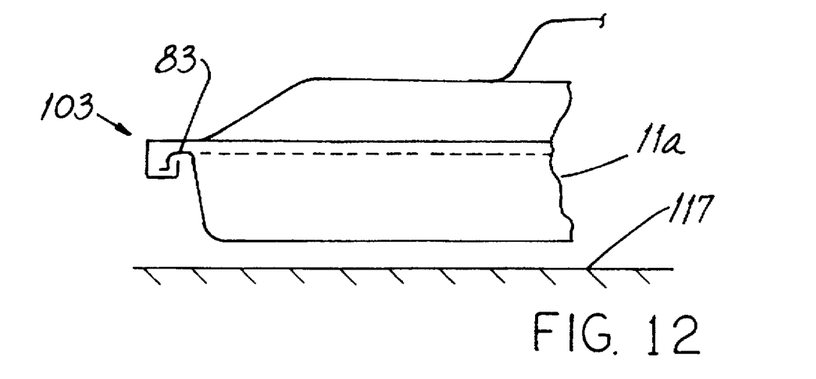
FIG. 12 is a side elevation view of the pan of FIG. 11 and a pan cover, both shown with respect to and spaced above a horizontal surface. Surfaces of parts are shown in dashed outline and parts are broken away.
Figure 14:
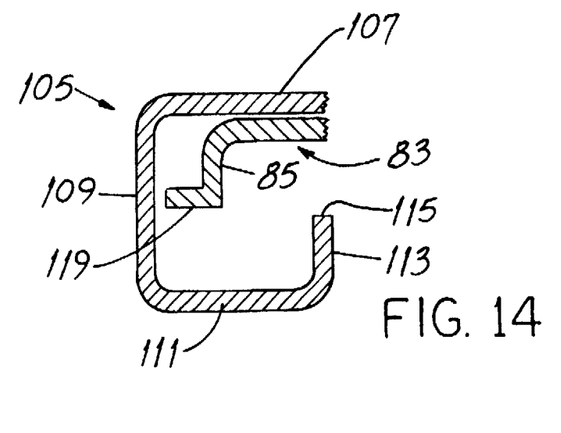
Figure 15:
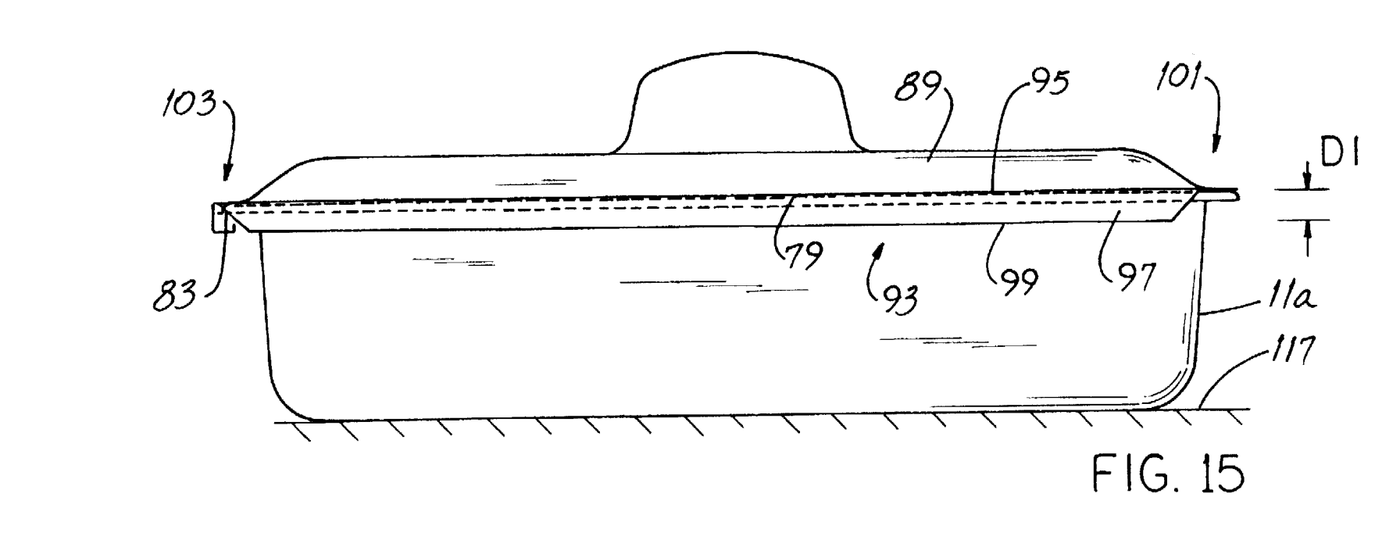
FIG. 15 is another side elevation view of the pan of FIG. 11 and the pan cover, both shown supported by a horizontal surface. Surfaces of parts are shown in dashed outline.
Figure 16:
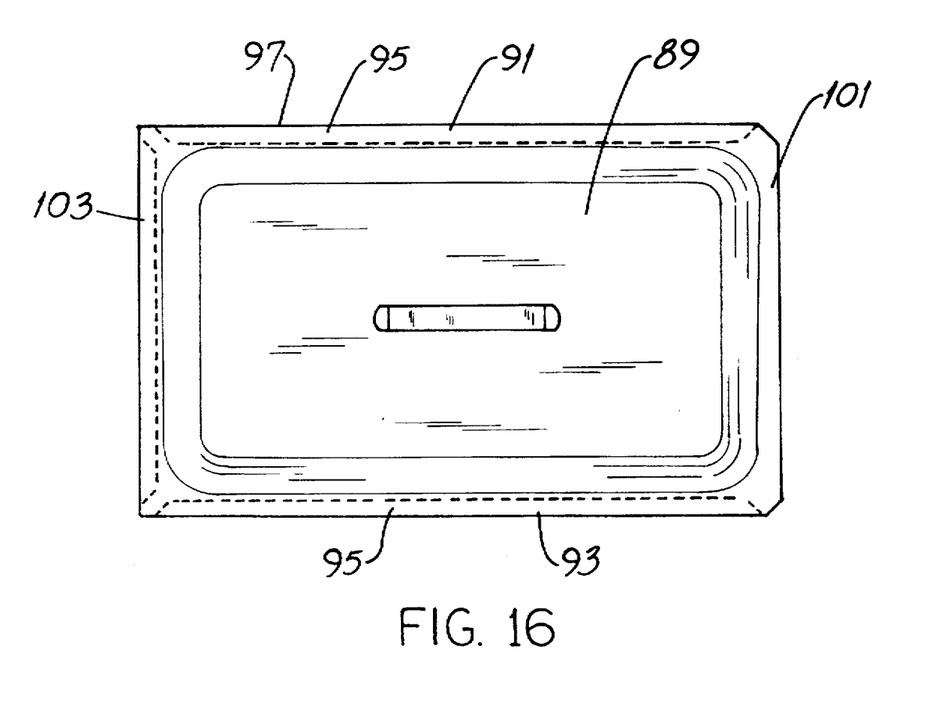
FIG. 16 is a top plan view of the carrying cover. Surfaces of parts are shown in dashed outline.

Referring particularly to FIGS. 12, 14, 15 the carrying cover 89 includes a pair of side channels 91 and 93, respectively, each for sliding engagement with a respective side edge 77, 79, of the pan 11a. Each cover side channel 91, 93 includes an upper member 95, an edge panel 97 extending downwardly from the upper member 95, and a lip 99 extending inwardly from the edge panel 97. The upper member 95 and the lip 99 of each of the side channels 91, 93 are spaced apart by a first dimension D1.

The cover 89 has first and second ends 101, 103, respectively, and the first end 101 is open, i.e., free of any downwardly projecting panel or the like, so that the cover 89 and its side channels 91, 93 may slidably engage the pan 11a and its side edges 77, 79. That is, the channels 91, 93 "wrap around" and extend beneath such side edges 77, 79 to support such edges 77, 79 when the cover 89 is used to carry the pan 11a.

Figure 13:
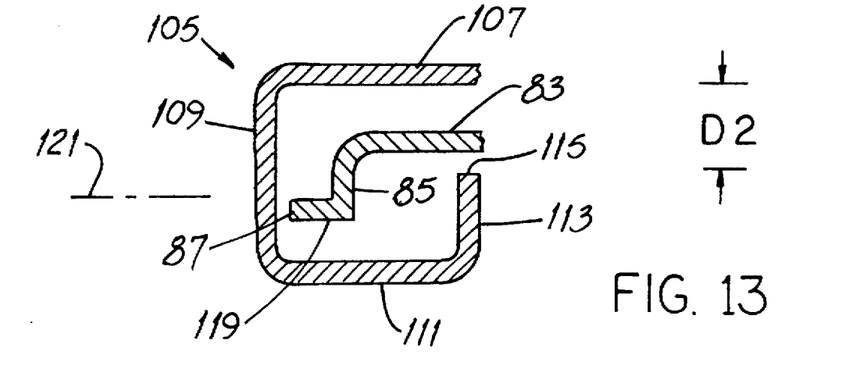

Referring particularly to FIGS. 12, 13, 14 and 15, the cover second end 103 has a channel 105 extending therealong. Such channel 105 has a horizontal upper component 107, a vertical end panel 109 extending downwardly from the upper component 107, a horizontal ledge 111 extending inwardly from the end panel 109 and a vertical stop 113 extending upwardly from the ledge 111. The upper component 107, end panel 109, ledge 111 and stop 113 are each substantially flat and define right angles as shown in FIGS. 13 and 14. The stop 113 is terminated by a thin, edge—like border 115 spaced from the upper component 107 by a second dimension D2 which is less than the first dimension D1. (The terms "horizontal" and "vertical" refer to component orientation when the cover 89 is resting on a pan 11a or on a horizontal surface 117.)

In a specific embodiment, the stop border 115 is substantially parallel to the upper component 107 of the cover channel 105. And when the cover 89 is on the pan 11a, the border 115 is parallel to the second end edge 83 of the pan 11a.

The combination of the pan 11a and the cover 89 is characterized by certain features, depending upon the then—existing relationship of the pan 11a, the cover 89 and a support surface 117, e.g., a table. The second end edge 83 of the pan has a rim 119 and in the "at—rest" position shown in FIGS. 14 and 15, i.e., when the cover 89 is on the pan 11a, the pan 11a is at rest on a surface 117 and the cover 89 is at rest on the pan 11a, the border 115 is below the lip 119. In the "pan—carry" mode shown in FIGS. 12, 13 and 17, i.e., when the cover 89 is on the pan 11a, the pan 11a is spaced from a surface 117 and the cover 89 supports the weight of pan 11a and its contents, the border 115 is above the rim 119.

Figure 17:
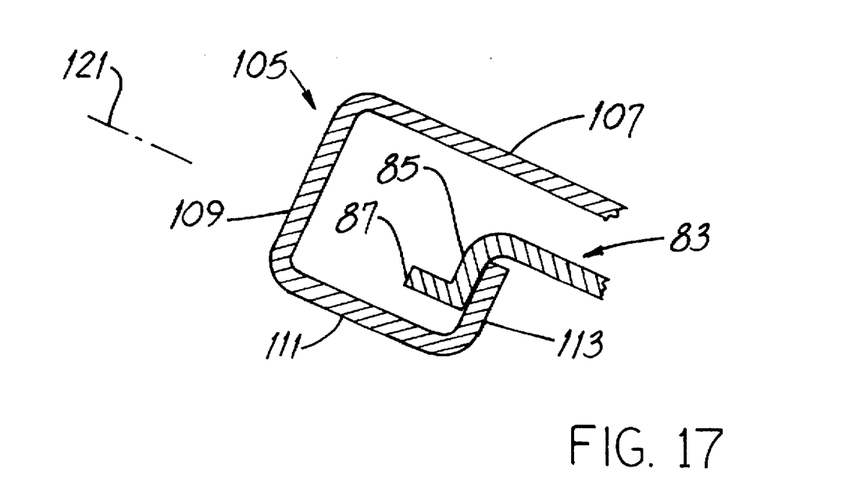

Referring particularly to FIGS. 13 and 17, the stop 113 and the lip 85 are in overlapping engagement with one another, irrespective of whether the pan 11a and cover 89 are in the at—rest position or the pan—carry mode. (The stop 113 and the lip 85 are in overlapping engagement when such stop 113 and lip 85 intersect a plane 121 parallel to the channels 91, 93.)

The stop 113 and the lip 85 contact one another as shown in FIG. 17 when the pan 11a and cover 89 are in the pan—carry mode as described above and both are tipped (as shown in FIG. 17) so that the first end edge 81 of the pan 11a and the open first end 101 of the cover 89 are lower than the second end edge 83 of the pan 11a and the cover second end 103. It has been found that such overlapping engagement of the stop 113 and the lip 85 retain the pan 11a in the cover 89 and prevent such pan 11a from sliding out of the cover open end 101 even when the angle of tilt is as much as 30° or so.

While the principles of the invention have been shown and described in connection with one or more specific embodiments, it is to be understood clearly that such embodiment(s) are by way of example and are not limiting.

What is claimed:

1. In the combination of a steam table pan for keeping food warm and a cover for lifting and carrying the pan, and wherein:

the pan includes a container portion, a pair of side edges and first and second end edges, such edges protruding away from the container portion;

the second end edge includes a downwardly—turned lip;

the cover includes a pair of side channels, each for engaging a respective side edge of the pan;

each side channel includes an upper member, an edge panel extending downwardly from the upper member, and a lip extending inwardly from the edge panel; and the upper member and the lip of each of the side channels are spaced apart by a first dimension; the improvement wherein:

the cover includes an end channel having an upper component, an end panel extending downwardly from the upper component, a ledge extending inwardly from the end panel and a stop extending upwardly from the ledge; and the stop has a border spaced from the upper component by a second dimension which is less than the first dimension.

2. The combination of claim 1 wherein:

the cover has a first end and a second end;

the cover end channel extends along the second end; and the first end is open, thereby permitting the cover to slidably engage the pan.

3. The combination of claim 2 wherein:

the border is substantially parallel to the upper component.

4. The combination of claim 3 wherein, when the cover is on the pan, the border is parallel to the second end edge of the pan.

5. The combination of claim 1 wherein the lip of the second end edge of the pan has a rim and wherein, when the cover is on the pan, the pan is at rest on a surface and the cover is at rest on the pan, the border is below the rim.

6. The combination of claim 1 wherein the lip of the second end edge of the pan has a rim and wherein, when the cover is on the pan, the pan is spaced from a surface and the cover supports the pan, the border is above the rim.

7. In the combination of a steam table pan for keeping food warm and a cover for lifting and carrying the pan, and wherein:

the pan includes a container portion and first and second end edges protruding away from the container portion;

the second end edge includes a downwardly-turned lip; the improvement wherein:

the cover includes first and second ends;

the second end has an end channel with an upper component, an end panel extending downwardly from the upper component, a ledge extending inwardly from the end panel and a stop extending upwardly from the ledge; and the stop and the lip are in overlapping engagement with one another, thereby preventing the pan from sliding toward the cover first end.

8. The combination of claim 7 wherein:

the stop has a border;

the lip of the second end edge of the pan has a rim; and when the cover is on the pan, the pan is at rest on a surface and the cover is at rest on the pan, the border is below the rim.

9. The combination of claim 7 wherein:

the stop has a border;

the lip of the second end edge of the pan has a rim; and when the cover is on the pan, the pan is spaced from a surface and the cover supports the pan, the border is above the rim.

* * * * *